(12) United States Patent
Steinberg

(10) Patent No.: US 9,279,594 B2
(45) Date of Patent: *Mar. 8, 2016

(54) SYSTEM, METHOD AND APPARATUS FOR USE OF DYNAMICALLY VARIABLE COMPRESSOR DELAY IN THERMOSTAT TO REDUCE ENERGY CONSUMPTION

(71) Applicant: EcoFactor, Inc., Millbrae, CA (US)

(72) Inventor: John Douglas Steinberg, Millbrae, CA (US)

(73) Assignee: EcoFactor, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/292,377

(22) Filed: May 30, 2014

(65) Prior Publication Data

US 2015/0021405 A1    Jan. 22, 2015

Related U.S. Application Data

(63) Continuation of application No. 12/774,580, filed on May 5, 2010, now Pat. No. 8,740,100.

(60) Provisional application No. 61/215,816, filed on May 11, 2009.

(51) Int. Cl.
*F24F 11/02* (2006.01)
*F24F 11/00* (2006.01)

(52) U.S. Cl.
CPC ........... *F24F 11/0001* (2013.01); *F24F 11/006* (2013.01); *F24F 2011/0002* (2013.01);
(Continued)

(58) Field of Classification Search
CPC . F24F 11/0001; F24F 11/0012; F24F 11/006; F24F 2011/0001; F24F 2011/0002; F24F 2011/0006; F24F 2011/0013; F24F 2011/0071; F24F 2011/0073
USPC .......... 236/46 C, 49.3; 62/158, 186; 454/258; 700/276
See application file for complete search history.

(56) References Cited

U.S. PATENT DOCUMENTS

| 4,136,732 A | 1/1979 | Demaray et al. |
| 4,341,345 A | 7/1982 | Hammer et al. |

(Continued)

FOREIGN PATENT DOCUMENTS

| EP | 0415747 A2 | 3/1991 |
| JP | 05-189659 | 7/1993 |

(Continued)

OTHER PUBLICATIONS

U.S. Appl. No. 13/470,074, Aug. 30, 2012, Steinberg.
(Continued)

*Primary Examiner* — Marc Norman
(74) *Attorney, Agent, or Firm* — Knobbe, Martens, Olson & Bear, LLP

(57) ABSTRACT

Systems and methods are disclosed for reducing the usage of a ventilation system. For example, one or more of the exemplary systems comprise a thermostatic controller that has at least two settings for the delay occurring between turning the ventilation system off and then turning the system back on. One setting being for a first interval and at least a second setting for a second interval that is longer than the first interval. A processor is in communication with the thermostatic controller and is configured to evaluate one or more parameters including at least the temperature outside the structure conditioned by the ventilation system. The processor is further configured to determine whether to adopt the first interval or the second interval based upon the values of the parameters.

20 Claims, 11 Drawing Sheets

(52) U.S. Cl.
CPC . *F24F2011/0006* (2013.01); *F24F 2011/0013* (2013.01); *F24F 2011/0071* (2013.01); *F24F 2011/0073* (2013.01)

(56) References Cited

U.S. PATENT DOCUMENTS

| | | |
|---|---|---|
| 4,403,644 A | 9/1983 | Hebert |
| 4,475,685 A | 10/1984 | Grimado et al. |
| 4,655,279 A | 4/1987 | Harmon |
| 4,674,027 A | 6/1987 | Beckey |
| 5,124,502 A | 6/1992 | Nelson et al. |
| 5,244,146 A | 9/1993 | Jefferson et al. |
| 5,270,952 A | 12/1993 | Adams et al. |
| 5,314,004 A | 5/1994 | Strand et al. |
| 5,348,078 A | 9/1994 | Dushane et al. |
| 5,462,225 A | 10/1995 | Massara et al. |
| 5,544,036 A | 8/1996 | Brown et al. |
| 5,555,927 A | 9/1996 | Shah |
| 5,572,438 A | 11/1996 | Ehlers et al. |
| 5,682,949 A | 11/1997 | Ratcliffe et al. |
| 5,717,609 A | 2/1998 | Packa et al. |
| 5,725,148 A | 3/1998 | Hartman |
| 5,729,474 A | 3/1998 | Hildebrand et al. |
| 5,818,347 A | 10/1998 | Dolan et al. |
| 5,977,964 A | 11/1999 | Williams et al. |
| 6,079,626 A | 6/2000 | Hartman |
| 6,115,713 A | 9/2000 | Pascucci et al. |
| 6,145,751 A | 11/2000 | Ahmed |
| 6,178,362 B1 | 1/2001 | Woolard et al. |
| 6,241,156 B1 | 6/2001 | Kline et al. |
| 6,260,765 B1 | 7/2001 | Natale et al. |
| 6,351,693 B1 | 2/2002 | Monie |
| 6,400,956 B1 | 6/2002 | Richton |
| 6,400,996 B1 | 6/2002 | Hoffberg et al. |
| 6,437,692 B1 | 8/2002 | Petite et al. |
| 6,478,233 B1 | 11/2002 | Shah |
| 6,480,803 B1 | 11/2002 | Pierret et al. |
| 6,483,906 B1 | 11/2002 | Lggulden et al. |
| 6,536,675 B1 | 3/2003 | Pesko et al. |
| 6,542,076 B1 | 4/2003 | Joao |
| 6,549,130 B1 | 4/2003 | Joao |
| 6,574,537 B2 | 6/2003 | Kipersztok et al. |
| 6,580,950 B1 | 6/2003 | Johnson |
| 6,594,825 B1 | 7/2003 | Goldschmidtlki et al. |
| 6,595,430 B1 | 7/2003 | Shah |
| 6,598,056 B1 | 7/2003 | Hull et al. |
| 6,619,555 B2 | 9/2003 | Rosen |
| 6,622,097 B2 | 9/2003 | Hunter |
| 6,622,115 B1 | 9/2003 | Brown et al. |
| 6,622,925 B2 | 9/2003 | Carner et al. |
| 6,622,926 B1 | 9/2003 | Sartain et al. |
| 6,628,997 B1 | 9/2003 | Fox et al. |
| 6,633,823 B2 | 10/2003 | Bartone et al. |
| 6,643,567 B2 | 11/2003 | Kolk et al. |
| 6,644,098 B2 | 11/2003 | Cardinale et al. |
| 6,671,586 B2 | 12/2003 | Davis et al. |
| 6,695,218 B2 | 2/2004 | Fleckenstein |
| 6,700,224 B2 | 3/2004 | Biskup, Sr. |
| 6,726,113 B2 | 4/2004 | Guo |
| 6,731,992 B1 | 5/2004 | Ziegler |
| 6,734,806 B1 | 5/2004 | Cratsley |
| 6,772,052 B1 | 8/2004 | Amundsen |
| 6,785,592 B1 | 8/2004 | Smith |
| 6,785,630 B2 | 8/2004 | Kolk |
| 6,786,421 B2 | 9/2004 | Rosen |
| 6,789,739 B2 | 9/2004 | Rosen |
| 6,853,959 B2 | 2/2005 | Ikeda et al. |
| 6,868,293 B1 | 3/2005 | Schurr |
| 6,868,319 B2 | 3/2005 | Kipersztok et al. |
| 6,882,712 B1 | 4/2005 | Iggulden et al. |
| 6,889,908 B2 | 5/2005 | Crippen et al. |
| 6,891,838 B1 | 5/2005 | Petite et al. |
| 6,912,429 B1 | 6/2005 | Bilger |
| 6,991,029 B2 | 1/2006 | Orfield et al. |
| 7,009,493 B2 | 3/2006 | Howard |
| 7,031,880 B1 | 4/2006 | Seem et al. |
| 7,039,532 B2 | 5/2006 | Hunter |
| 7,061,393 B2 | 6/2006 | Buckingham et al. |
| 7,089,088 B2 | 8/2006 | Terry et al. |
| 7,130,719 B2 | 10/2006 | Ehlers et al. |
| 7,130,832 B2 | 10/2006 | Bannai et al. |
| H2176 H | 12/2006 | Meyer et al. |
| 7,167,079 B2 | 1/2007 | Smyth et al. |
| 7,187,986 B2 | 3/2007 | Johnson et al. |
| 7,205,892 B2 | 4/2007 | Luebke et al. |
| 7,206,670 B2 | 4/2007 | Pimputkar et al. |
| 7,215,746 B2 | 5/2007 | Iggulden et al. |
| 7,216,015 B2 | 5/2007 | Poth |
| 7,231,424 B2 | 6/2007 | Bodin et al. |
| 7,232,075 B1 | 6/2007 | Rosen |
| 7,242,988 B1 | 7/2007 | Hoffberg et al. |
| 7,260,823 B2 | 8/2007 | Schlack et al. |
| 7,356,384 B2 | 4/2008 | Gull et al. |
| 7,476,020 B2 | 1/2009 | Zufferey et al. |
| 7,483,964 B1 | 1/2009 | Jackson et al. |
| 7,644,869 B2 | 1/2010 | Hoglund et al. |
| 7,702,424 B2 | 4/2010 | Cannon et al. |
| 7,758,729 B1 | 7/2010 | DeWhitt |
| 7,784,704 B2 | 8/2010 | Harter |
| 7,848,900 B2 | 12/2010 | Steinberg et al. |
| 7,869,904 B2 | 1/2011 | Cannon et al. |
| 7,894,943 B2 | 2/2011 | Sloup et al. |
| 7,908,116 B2 | 3/2011 | Steinberg et al. |
| 7,908,117 B2 | 3/2011 | Steinberg et al. |
| 8,010,237 B2 | 8/2011 | Cheung et al. |
| 8,019,567 B2 | 9/2011 | Steinberg et al. |
| D646,990 S | 10/2011 | Rhodes |
| 8,090,477 B1 | 1/2012 | Steinberg |
| 8,131,497 B2 | 3/2012 | Steinberg et al. |
| 8,131,506 B2 | 3/2012 | Steinberg et al. |
| D659,560 S | 5/2012 | Rhodes |
| 8,180,492 B2 | 5/2012 | Steinberg |
| 8,340,826 B2 | 12/2012 | Steinberg et al. |
| D673,467 S | 1/2013 | Lee et al. |
| 8,412,488 B2 | 4/2013 | Steinberg et al. |
| 8,423,322 B2 | 4/2013 | Steinberg et al. |
| 8,428,785 B2 | 4/2013 | Boucher et al. |
| 8,457,797 B2 | 6/2013 | Imes et al. |
| 8,498,753 B2 | 7/2013 | Steinberg et al. |
| 8,556,188 B2 | 10/2013 | Steinberg |
| 8,596,550 B2 | 12/2013 | Steinberg et al. |
| 8,712,590 B2 | 4/2014 | Steinberg |
| D705,095 S | 5/2014 | Steinberg et al. |
| 8,738,327 B2 | 5/2014 | Steinberg et al. |
| 8,740,100 B2 | 6/2014 | Steinberg |
| 8,751,186 B2 | 6/2014 | Steinberg et al. |
| 8,840,033 B2 | 9/2014 | Steinberg |
| 8,850,348 B2 | 9/2014 | Fadell et al. |
| 8,886,488 B2 | 11/2014 | Steinberg et al. |
| 9,057,649 B2 | 6/2015 | Steinberg et al. |
| 9,134,710 B2 | 9/2015 | Cheung et al. |
| 2003/0040934 A1 | 2/2003 | Skidmore et al. |
| 2004/0176880 A1 | 9/2004 | Obradovich et al. |
| 2005/0222889 A1 | 10/2005 | Lai et al. |
| 2005/0288822 A1 | 12/2005 | Rayburn |
| 2006/0045105 A1 | 3/2006 | Dobosz et al. |
| 2006/0214014 A1 | 9/2006 | Bash et al. |
| 2007/0043477 A1 | 2/2007 | Ehlers et al. |
| 2007/0045431 A1 | 3/2007 | Chapman et al. |
| 2007/0146126 A1 | 6/2007 | Wang |
| 2008/0083234 A1 | 4/2008 | Krebs et al. |
| 2008/0198549 A1 | 8/2008 | Rasmussen et al. |
| 2008/0281472 A1 | 11/2008 | Podgorny et al. |
| 2009/0052859 A1 | 2/2009 | Greenberger et al. |
| 2009/0099699 A1 | 4/2009 | Steinberg et al. |
| 2009/0125151 A1 | 5/2009 | Steinberg et al. |
| 2009/0240381 A1 | 9/2009 | Lane |
| 2009/0281667 A1 | 11/2009 | Masui et al. |
| 2010/0019052 A1 | 1/2010 | Yip |
| 2010/0070086 A1 | 3/2010 | Harrod et al. |
| 2010/0070089 A1 | 3/2010 | Harrod et al. |
| 2010/0070093 A1 | 3/2010 | Harrod et al. |
| 2010/0156608 A1 | 6/2010 | Bae et al. |
| 2010/0162285 A1 | 6/2010 | Cohen et al. |

(56) References Cited

U.S. PATENT DOCUMENTS

| | | | |
|---|---|---|---|
| 2010/0211224 | A1 | 8/2010 | Keeling et al. |
| 2010/0235004 | A1 | 9/2010 | Thind |
| 2010/0289643 | A1 | 11/2010 | Trundle et al. |
| 2010/0318227 | A1 | 12/2010 | Steinberg et al. |
| 2011/0031323 | A1 | 2/2011 | Nold et al. |
| 2011/0046792 | A1 | 2/2011 | Imes et al. |
| 2011/0046798 | A1 | 2/2011 | Imes et al. |
| 2011/0046799 | A1 | 2/2011 | Imes et al. |
| 2011/0046800 | A1 | 2/2011 | Imes et al. |
| 2011/0046801 | A1 | 2/2011 | Imes et al. |
| 2011/0051823 | A1 | 3/2011 | Imes et al. |
| 2011/0054699 | A1 | 3/2011 | Imes et al. |
| 2011/0054710 | A1 | 3/2011 | Imes et al. |
| 2011/0173542 | A1 | 7/2011 | Imes et al. |
| 2011/0202185 | A1 | 8/2011 | Imes et al. |
| 2011/0214060 | A1 | 9/2011 | Imes et al. |
| 2011/0224838 | A1 | 9/2011 | Imes et al. |
| 2011/0246898 | A1 | 10/2011 | Imes et al. |
| 2011/0253796 | A1 | 10/2011 | Posa et al. |
| 2011/0290893 | A1 | 12/2011 | Steinberg |
| 2011/0307101 | A1 | 12/2011 | Imes et al. |
| 2011/0307103 | A1 | 12/2011 | Cheung et al. |
| 2012/0023225 | A1 | 1/2012 | Imes et al. |
| 2012/0046859 | A1 | 2/2012 | Imes et al. |
| 2012/0064923 | A1 | 3/2012 | Imes et al. |
| 2012/0065935 | A1 | 3/2012 | Steinberg et al. |
| 2012/0072033 | A1 | 3/2012 | Imes et al. |
| 2012/0086562 | A1 | 4/2012 | Steinberg |
| 2012/0093141 | A1 | 4/2012 | Imes et al. |
| 2012/0101637 | A1 | 4/2012 | Imes et al. |
| 2012/0135759 | A1 | 5/2012 | Imes et al. |
| 2012/0158350 | A1 | 6/2012 | Steinberg et al. |
| 2012/0215725 | A1 | 8/2012 | Imes et al. |
| 2012/0221151 | A1 | 8/2012 | Steinberg |
| 2012/0221718 | A1 | 8/2012 | Imes et al. |
| 2012/0252430 | A1 | 10/2012 | Imes et al. |
| 2012/0324119 | A1 | 12/2012 | Imes et al. |
| 2013/0053054 | A1 | 2/2013 | Lovitt et al. |
| 2013/0054758 | A1 | 2/2013 | Imes et al. |
| 2013/0054863 | A1 | 2/2013 | Imes et al. |
| 2013/0060387 | A1 | 3/2013 | Imes et al. |
| 2013/0144453 | A1 | 6/2013 | Subbloie |
| 2013/0167035 | A1 | 6/2013 | Imes et al. |
| 2013/0173064 | A1 | 7/2013 | Fadell et al. |
| 2013/0178985 | A1 | 7/2013 | Lombard et al. |
| 2013/0226502 | A1 | 8/2013 | Steinberg et al. |
| 2013/0310989 | A1 | 11/2013 | Steinberg et al. |
| 2013/0338837 | A1 | 12/2013 | Hublou et al. |
| 2014/0039690 | A1 | 2/2014 | Steinberg |
| 2014/0188290 | A1 | 7/2014 | Steinberg et al. |
| 2014/0229018 | A1 | 8/2014 | Steinberg |
| 2014/0316581 | A1 | 10/2014 | Fadell et al. |
| 2015/0025691 | A1 | 1/2015 | Fadell et al. |
| 2015/0043615 | A1 | 2/2015 | Steinberg et al. |
| 2015/0120235 | A1 | 4/2015 | Steinberg et al. |
| 2015/0168001 | A1 | 6/2015 | Steinberg |

FOREIGN PATENT DOCUMENTS

| | | |
|---|---|---|
| JP | 2010-038377 | 2/2010 |
| JP | 2010-286218 | 12/2010 |
| KR | 10-1994-0011902 | 6/1994 |
| KR | 10-1999-0070368 | 9/1999 |
| KR | 10-2000-0059532 | 10/2000 |
| WO | WO 2005/098331 A1 | 10/2005 |
| WO | WO 2011/149600 | 12/2011 |
| WO | WO 2012/024534 | 2/2012 |
| WO | WO 2013/187996 | 12/2013 |

OTHER PUBLICATIONS

U.S. Appl. No. 13/523,697, Jun. 14, 2012, Hublou et al.
U.S. Appl. No. 13/725,447, Jun. 6, 2013, Steinberg.
U.S. Appl. No. 13/852,577, Mar. 28, 2013, Steinberg et al.
U.S. Appl. No. 13/858,710, Sep. 5, 2013, Steinberg et al.
U.S. Appl. No. 13/861,189, Apr. 11, 2013, Steinberg et al.
U.S. Appl. No. 14/082,675, Nov. 18, 2003, Steinberg et al.
Arens, et al., "How Ambient Intelligence Will Improve Habitability and Energy Efficiency in Buildings", 2005, research paper, Center for the Built Environment, Controls and Information Technology.
Bourhan, et al., "Cynamic model of an HVAC system for control analysis", Elsevier 2004.
Brush, et al., Preheat—Controlling Home Heating with Occupancy Prediction, 2013.
Comverge SuperStat Flyer, prior to Jun. 28, 2007.
Control4 Wireless Thermostat Brochure, 2006.
Cooper Power Systems Web Page, 2000-2009.
Emerson Climate Technologies, "Network Thermostat for E2 Building Controller Installation and Operation Manual", 2007.
Enernoc Web Page, 2004-2009.
Enerwise Website, 1999-2009.
Gupta, Adding GPS-Control to Traditional Thermostats: An Exploration of Potential Energy Savings and Design Challenges, MIT, 2009.
Gupta, et al., A Persuasive GPS-Controlled Thermostat System, MIT, 2008.
Honeywell Programmable Thermostat Owner's Guide, www.honeywell.com/yourhome, 2004.
Honeywell, W7600/W7620 Controller Reference Manual, HW0021207, Oct. 1992.
Johnson Controls, "T600HCx-3 Single-Stage Thermostats", 2006.
Johnson Controls, Touch4 building automation system brochure, 2007.
Kilicotte, et al., "Dynamic Controls for Energy Efficiency and Demand Response: Framework Concepts and a New Construction Study Case in New York", Proceedings of the 2006 ACEEE Summer Study of Energy Efficiency in Buildings, Pacific Grove. CA, Aug. 13-18, 2006.
Krumm, et al., Learning Time-Based Presence Probabilities, Jun. 2011.
Lin, et al., "Multi-Sensor Single-Actuator Control of HVAC Systems", 2002.
Pier, Southern California Edison, Demand Responsive Control of Air Conditioning via Programmable Communicating Thermostats Draft Report, Feb. 14, 2006.
Proliphix Thermostat Brochure, prior to Jun. 2007.
Raji, "Smart Networks for Control", IEEE Spectrum, Jun. 1994.
Scott, et al., Home Heating Using GPS-Based Arrival Prediction, 2010.
Wang, et al., "Opportunities to Save Energy and Improve Comfort by Using Wireless Sensor Networks in Buildings," (2003), Center for Environmental Design Research.
Wetter, et al., A comparison of deterministic and probabilistic optimization algorithms for non-smooth simulation-based optimization, Building and Environment 39, 2004, pp. 989-999.
International Search Report and Written Opinion for PCT/US2013/035726, dated Aug. 6, 2013.
Written Opinion and Search Report for PCT/US2011/032537, dated Dec. 12, 2011.
U.S. Appl. No. 12/805,705, Jun. 10, 2010, Crabtree.
U.S. Appl. No. 13/729,401, Dec. 28, 2012, Sloop.
U.S. Appl. No. 14/263,762, Apr. 28, 2014, Steinberg.
U.S. Appl. No. 14/285,384, May 22, 2014, Steinberg, et al.
U.S. Appl. No. 14/292,377, May 30, 2014, Steinberg.
U.S. Appl. No. 14/491,554, Sep. 19, 2014, Steinberg.
U.S. Appl. No. 14/527,433, Oct. 29, 2014, Steinberg, et al.
U.S. Appl. No. 14/731,221, Jun. 4, 2015, Steinberg, et al.
International Preliminary Report on Patentability in PCT/US2013/035726 dated Dec. 16, 2014.

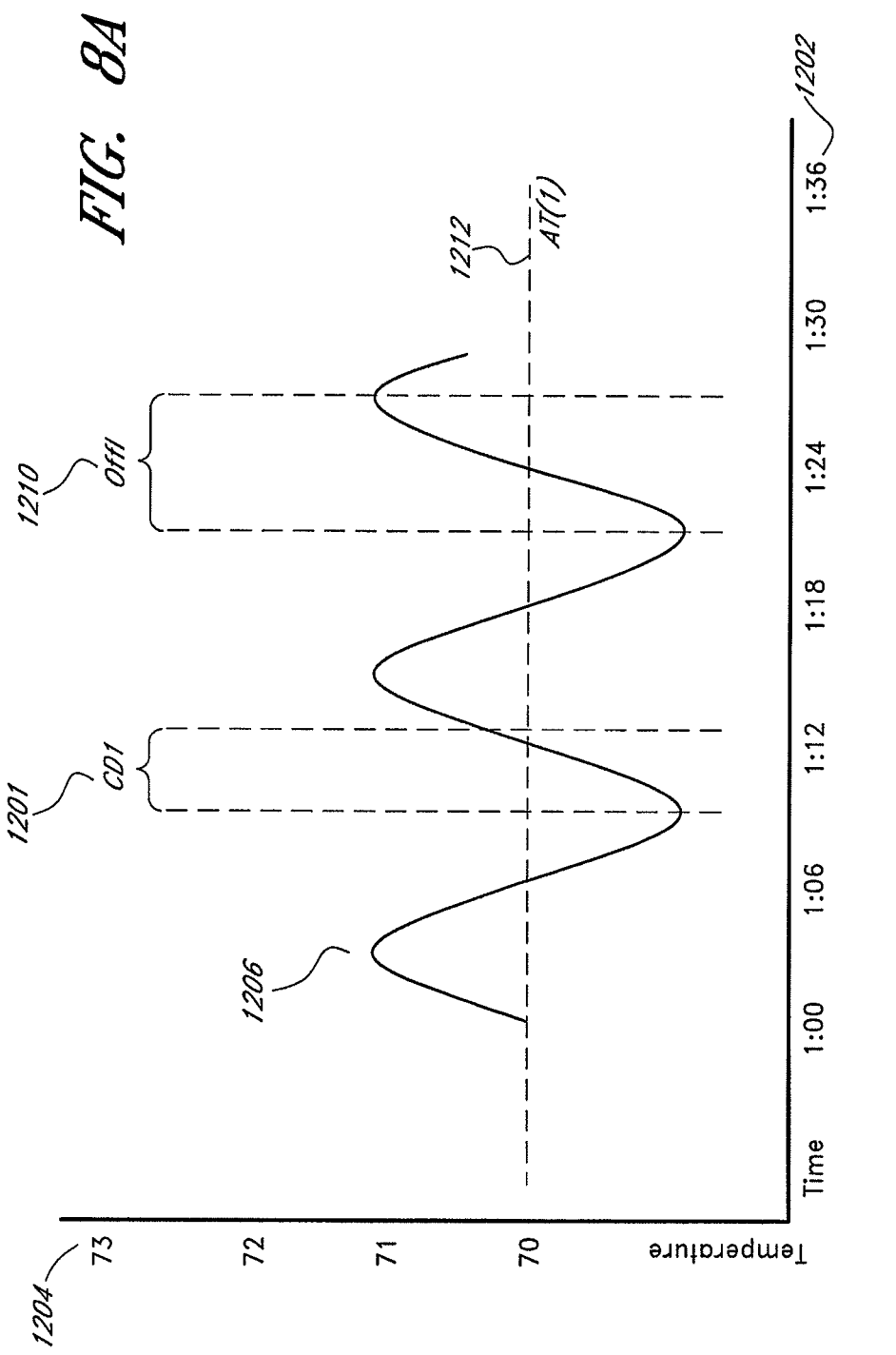

SYSTEM, METHOD AND APPARATUS FOR USE OF DYNAMICALLY VARIABLE COMPRESSOR DELAY IN THERMOSTAT TO REDUCE ENERGY CONSUMPTION

CROSS-REFERENCE TO RELATED APPLICATIONS

Any and all applications for which a foreign or domestic priority claim is identified in the Application Data Sheet, or any correction thereto, are hereby incorporated by reference under 37 CFR 1.57.

BACKGROUND OF THE INVENTION

Field of the Invention

Central heating of buildings dates to ancient Roman times. Control of their systems consisted of adding fuel to the fire or extinguishing it. The use of forced air systems for central heating began roughly at the beginning of the $20^{th}$ century. Once easily controllable energy sources such as heating oil, natural gas and electrical resistance were employed to heat the circulated oil, means for more accurately controlling the cycling of the heat source became both possible and necessary.

The first mechanical means for regulating room temperature by sensing temperature and automatically adjusting date from the late $19^{th}$ century. These devices evolved into the simple bi-metallic devices that became popular in the 1950s, such as the iconic round Honeywell thermostats that are still available today.

These thermostats sense temperature changes by using a coiled spring that is composed of a sandwich of two different metals with different thermal coefficients of expansion, which thereby causes the coil to move with temperature changes. The center of the coil is generally fixed; the free end of the spring moves one way when it gets warmer and the other when it gets colder. The movement of the free end of the spring is used to open and close the circuit that turns on and off the HVAC system. In early versions of this type of thermostat, the electrical switch was often in the form of liquid mercury in a glass tube: when the electrically conductive mercury flowed to one end of the tube, it touched a wire and completed the circuit; when the spring tilted the tube, it flowed the other way so that the mercury no longer contacted the wire, thus breaking the circuit.

One salutary effect of the use of such switches was that the weight of the mercury in the tube added physical inertia to the temperature sensing mechanism, as it has been shown that rapid cycling of HVAC systems is both annoying to occupants and more stressful to the mechanical systems than less frequent cycling is. Thus as environmental concerns about mercury grew in recent years, manufacturers dispensed with the mercury switches and began using magnets to force the contacts to remain closed until changing temperatures had put sufficient tension into the bimetallic spring to overcome the magnetic closure. As this effect became better understood and was designed into thermostats, it became a standard design feature. The hysteresis band or dead zone is now commonly designed to hold the desired setpoint within a range of +/−1 degree Fahrenheit. So, for example, if the heating setpoint is 68 degrees F., the furnace will turn on when the inside temperature as sensed by the thermostat falls to 67 degrees F., and will turn off again when the inside temperature as sensed by the thermostat reaches 69 degrees F. Thus the inside temperature is allowed to oscillate within a range of two degrees F.

When residential refrigerant-based air conditioners became widely available in the 1950s, the same kinds of thermostats were used to control them as well. The need for a means to preventing rapid cycling is even more important for refrigerant-based systems is even more critical because there is a risk of significant physical damage to a compressor if it is turned on too soon after being turned off—if the refrigerant inside the compressor is still in liquid (and thus uncompressable) form when the compressor restarts, expensive mechanical failures are possible.

Electronic thermostats have been available for more than 20 years. Many of these are also programmable. In general, these thermostats no longer use mechanical systems to sense temperature, relying instead on electrical devices such as thermistors or thermal diodes. Switching of the HVAC system is accomplished with solenoids or relays triggered by logic circuits in microprocessors. With such systems, adjustability of the hysteresis band is relatively simple, at least in theory. However, most systems do not allow direct access to this parameter. And the hysteresis band only protects the system against rapid automatic cycling. The hysteresis band will not prevent a user from rapidly changing settings, which can cause the damage discussed above.

The way most electronic systems approach this problem is to enforce, via the electronic circuitry, a compressor delay—that is, whenever the compressor is switched off, the thermostat prevents it from restarting for a set interval, usual in the range of two to five minutes or so. (Some air conditioners may have an additional fail-safe delay in series with any circuitry in the thermostat as well.)

Many programmable thermostats include mechanical switches to allow the installer or user to adjust the compressor delay for the system. But because it is generally expected that the installer of the system will set this parameter once based upon the requirements of the specific air conditioner being controlled, these mechanical switches are generally not accessible to the user from outside the unit. Changing the compressor delay generally requires disassembling the thermostat.

Academic research has shown that it is not just physical systems that have hysteresis effects. Perceived comfort at various temperatures is not independent of temperatures at earlier points in time. Humans have been shown to be relatively insensitive to slow, gradual changes in temperature, at least within narrow ranges of a few degrees F. Conversely, people do notice rapid changes within the same narrow range. It has been shown that an appropriately shaped pattern of ramped setpoints—varying the inside temperature by more than the normal +/−1 degree F. range in specific ways—can maintain comfort with a lower average temperature in the case of heating, and a higher average temperature in the case of cooling, than is possible with constant setpoints. Reducing average setpoints in winter and raising them in winter can significantly reduce energy consumption. Examples of such concepts are discussed in U.S. patent application Ser. No. 12/498,142, which is hereby incorporated herein by reference in its entirety and is to be considered part of this specification.

One specific pattern that has been validated is (in the case of heating) to allow the temperature to drift 2 degrees below the user's chosen setpoint over an extended period of 1-2 hours, and to then revert as quickly as possible to the originally desired setpoint. Because the slow cooling is not easily perceived, but the rapid reheating is, the subjective impression is weighted toward comfort, despite the fact that the average setpoint over the period of the "waveform" is 1 degree lower than the desired setpoint. (The pattern is inverted in the case of air conditioning.)

One approach to achieving the benefits of such a setpoint strategy is to specifically schedule each of the planned setpoint changes required to create such a thermal waveform. This approach requires some combination of significant local intelligence resident in the thermostat, a local computer capable of controlling the thermostat, and/or a remote server managing frequent setpoint changes on remote devices.

Another potential drawback to using programming changes to create such thermal waveforms with conventional thermostats is that such devices generally include a visual display that gives a readout of the programmed setpoint as well as the current inside temperature as measured by the thermostat. Many people have formed associations between specific objective temperatures and subjective feelings of comfort—e.g., the belief that they will be comfortable if it is 72 degrees inside their home, but uncomfortable if it is 74. These beliefs may have little basis in fact, or be true under certain circumstances but not under others, because comfort depends on numerous factors beyond dry-bulb temperature. Such factors include humidity, air movement, activity levels, and the aforementioned hysteresis effects. One of the potential perverse effects that can be caused by providing temperature readouts to occupants is that a person who might otherwise feel comfortable may become convinced that he is not simply because the thermostat's display shows a temperature that the occupant associates with discomfort.

It would be desirable for an HVAC control system to offer a simple way to create asymmetrical thermal waveforms without the need for highly detailed programming. It would also be desirable for an HVAC control system to offer a means to create asymmetrical thermal waveforms without changing the setpoint displayed by conventional thermostats.

BRIEF DESCRIPTION OF THE DRAWINGS

FIGS. 8(a) through 8(c) illustrate how changes in compressor delay settings affect HVAC cycling behavior by plotting time against temperature.

DETAILED DESCRIPTION OF THE PREFERRED EMBODIMENT

Figure 1:
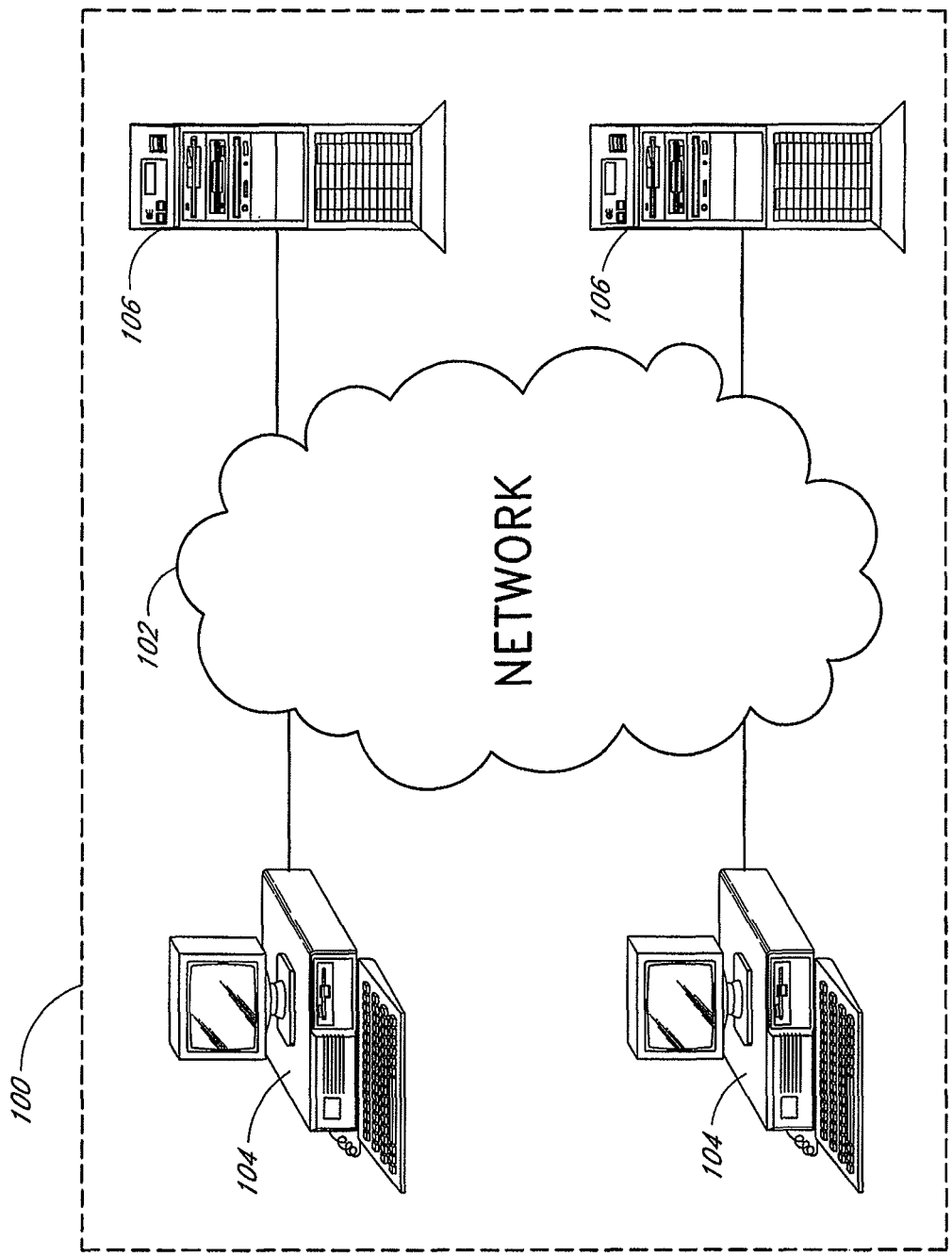
FIG. 1 shows an example of an overall environment in which an embodiment of the invention may be used.

Because most HVAC systems are essentially binary systems in that they are either ON or OFF, even the best thermostat is not capable of maintaining a stable temperature without variation. The use of a hysteresis band in effect creates an oscillation around the setpoint. The period of that wave form (that is, the length of time it takes to complete a full cycle) is determined by several factors, including the difference between outside and inside temperatures, the thermal performance of the structure being conditioned, and the capacity of the HVAC system. But the hysteresis band ensures that under most circumstances the amplitude of the waveform is roughly fixed. In other words, a traditional thermostat creates a temperature waveform inside the home that has a pre-defined peak-peak variation or amplitude that it seeks to maintain (generally 2 degrees F. peak to peak). As outside temperatures diverge from inside temperatures, the frequency of cycling increases. Under mild conditions, a well-insulated home with an appropriately sized HVAC system, the period of the waveform may be as long as an hour or more. On very cold winter days or hot summer days in a poorly insulated home with an oversized HVAC system, the period may be as short as a few minutes. Only when the conditions overwhelm the HVAC system (generally, when it is so hot that the air conditioner cannot maintain inside temperatures within the hysteresis band) does inside temperature go outside the defined range of waveform amplitude, at which point the system runs in open-loop mode.

Under normal conditions, the compressor delay will not materially affect that cycling behavior. But the compressor delay, if sufficiently long relative to the "natural" period of the system, will alter both the amplitude and the frequency of the thermal waveform. For example, if the setpoint is 69 degrees F., and under a given set of conditions (current outside temperature, humidity, and solar radiation being absorbed by the house, outside temperature, humidity and solar radiation absorbed by the house in the recent past, current inside temperature, inside temperature in the recent past, etc.) the air conditioner cycles "on" for seven minutes in order to lower the inside temperature from 70 degrees F. to 68 degrees F., then switches "off" for five minutes during which the temperature returns to 70 degrees, a compressor delay of four minutes or less will have no effect on the cycling of the system. Assuming steady-state conditions, the period of the "waveform" will be twelve minutes, its amplitude will be two degrees F., and the air conditioner will be operating on a roughly 58% duty cycle.

If under the same conditions the compressor delay is increased to eight minutes, the waveform will change significantly. Because the "off" portion of the waveform is forced to last longer than the time it takes for the temperature to reach the top of the hysteresis band, inside temperature will rise beyond 70 degrees, thereby increasing the amplitude of the waveform as well as its period. The "on" portion of the waveform is likely to increase in duration as well, because the air conditioner is now called upon to drive down inside temperature by more than two degrees. However, the key is that the waveform is no longer symmetrical around the nominal 69 degree setpoint. The air conditioner still turns off when it reaches 68 degrees. But the extended compressor delay means that the upper boundary of the waveform is higher than 70 degrees. If the combination of weather conditions and extended compressor delay allow the inside temperature to reach 71 degrees before the thermostat allows the compressor to turn on again, then the effective hysteresis band is three degrees rather than two degrees, and the average inside temperature (assuming a symmetrical waveform) will be 69.5 degrees, rather than 69. In addition, because there is a direct relationship between the average inside temperature maintained and HVAC cycle times, the increase in average inside temperature (which may be thought of the effective setpoint, as opposed to the nominal setpoint) will reduce A/C cycling, and thus energy use. But because the lower boundary of the hysteresis band is still below the chosen setpoint, the subjective effect of the change is likely to be minimal.

In the air conditioning context, raising average temperatures in this way will have two valuable benefits. First, as noted above, it can reduce energy usage with minimal effect on comfort. The second key benefit flows from the dynamic nature of the waveform effects and the relatively inelastic nature of electricity supply.

Air conditioning use is in many areas the largest component of electricity demand during the summer. On extremely hot days, demand may exceed supply, which can result in service disruptions in the form of blackouts and brownouts. Utilities seek to avoid such outcomes by bringing on line "peaker" power plants, which tend to be expensive to operate and to pollute more and emit larger quantities of greenhouse gases than do the generators used for base load. They also seek, when necessary, to purchase additional supply from other sources on what is effectively a spot market. More recently, utilities have also sought to buy down demand by paying customers to use less electricity during periods of critical demand. This process is known as demand response, and many utilities pay customers significant sums for the right to ask (or require) the customer to reduce energy usage during such peak periods. In the case of residential air conditioning, such programs often require that air conditioners be turned off for several hours at a time, or for setpoints to be raised significantly during such peak events.

The invention described herein offers a simple method for dynamically offering a small but meaningful demand response without significantly affecting comfort. Furthermore, the benefit offered will automatically increase with need. During mild weather conditions, an extended compressor delay will have little or no effect, but will also be unnecessary. On a hot but not exceptional summer afternoon, extending the compressor delay will cause mild increase in average inside temperature and a small decrease in the duty cycle of each affected HVAC system. Such small individual changes, when averaged across a large number of homes, can deliver useful reductions in peak loads. On critical days, which are virtually without exception the hottest days, the same compressor delay that caused a small rise in temperature on the moderately hot day causes a larger rise and thus a greater demand response contribution on the very hot day. Thus the amount of demand response generated automatically increases during the conditions in which it is most needed.

FIG. 1 shows an example of an overall environment 100 in which an embodiment of the invention may be used. The environment 100 includes an interactive communication network 102 with computers 104 connected thereto. Also connected to network 102 are one or more server computers 106, which store information and make the information available to computers 104. The network 102 allows communication between and among the computers 104 and 106.

Presently preferred network 102 comprises a collection of interconnected public and/or private networks that are linked to together by a set of standard protocols to form a distributed network. While network 102 is intended to refer to what is now commonly referred to as the Internet, it is also intended to encompass variations which may be made in the future, including changes additions to existing standard protocols.

One popular part of the Internet is the World Wide Web. The World Wide Web contains a large number of computers 104 and servers 106, which store HyperText Markup Language (HTML) documents capable of displaying graphical and textual information. HTML is a standard coding convention and set of codes for attaching presentation and linking attributes to informational content within documents.

The servers 106 that provide offerings on the World Wide Web are typically called websites. A website is often defined by an Internet address that has an associated electronic page. Generally, an electronic page is a document that organizes the presentation of text graphical images, audio and video.

In addition to the Internet, the network 102 can comprise a wide variety of interactive communication media. For example, network 102 can include local area networks, interactive television networks, telephone networks, wireless data systems, two-way cable systems, and the like.

Network 102 can also comprise servers 106 that provide services other than HTML documents. Such services may include the exchange of data with a wide variety of "edge" devices, some of which may not be capable of displaying web pages, but that can record, transmit and receive information.

In one embodiment, computers 104 and servers 106 are conventional computers that are equipped with communications hardware such as modem or a network interface card. The computers include processors such as those sold by Intel and AMD. Other processors may also be used, including general-purpose processors, multi-chip processors, embedded processors and the like.

Computers 104 can also be handheld and wireless devices such as personal digital assistants (PDAs), cellular telephones and other devices capable of accessing the network.

Computers 104 utilize a browser configured to interact with the World Wide Web. Such browsers may include Microsoft Explorer, Mozilla, Firefox, Opera or Safari. They may also include browsers used on handheld and wireless devices.

The storage medium may comprise any method of storing information. It may comprise random access memory (RAM), electronically erasable programmable read only memory (EEPROM), read only memory (ROM), hard disk, floppy disk, CD-ROM, optical memory, or other method of storing data.

Computers 104 and 106 may use an operating system such as Microsoft Windows, Apple Mac OS, Linux, Unix or the like.

Computers 106 may include a range of devices that provide information, sound, graphics and text, and may use a variety of operating systems and software optimized for distribution of content via networks.

Figure 2:
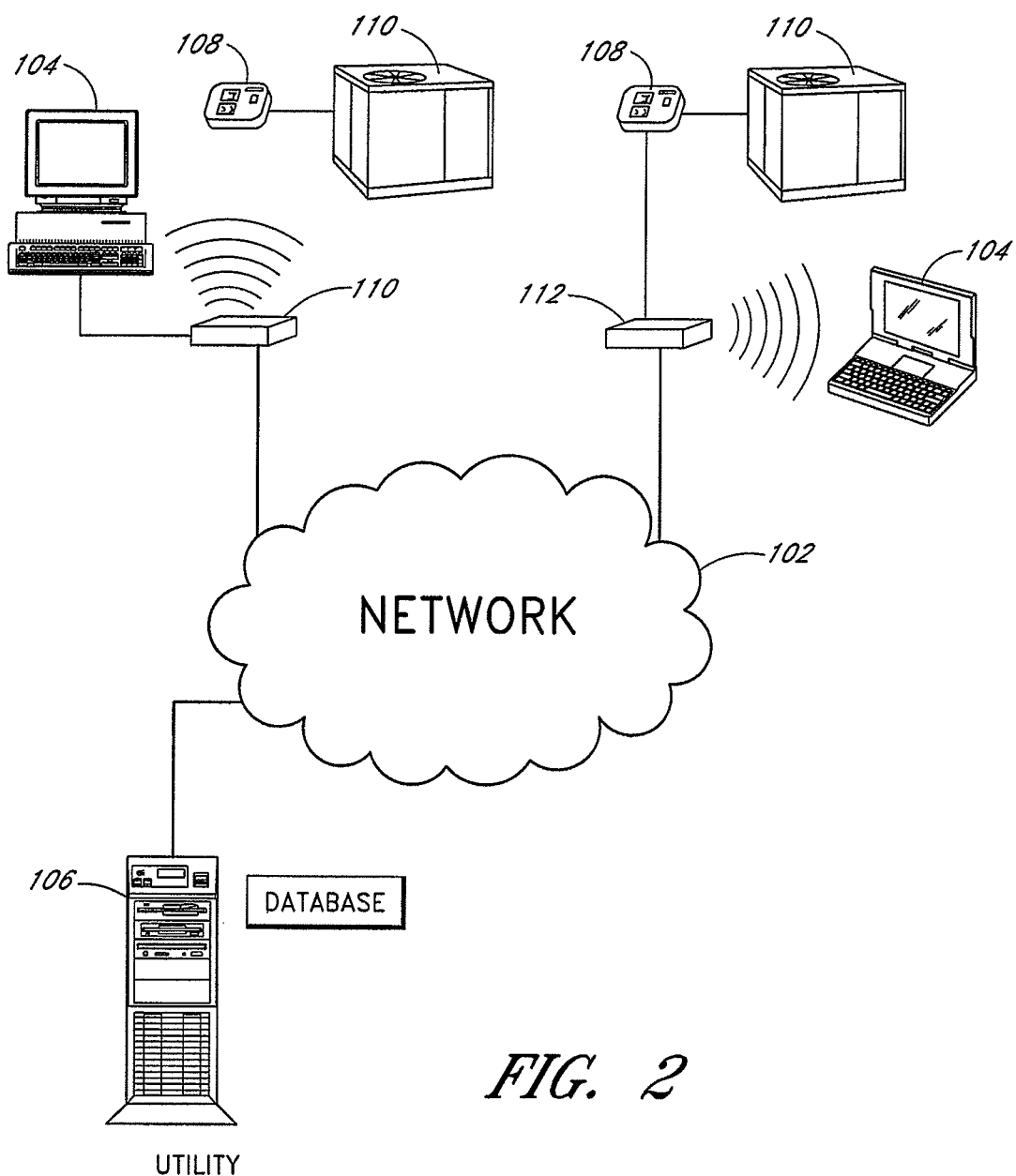
FIG. 2 shows a high-level illustration of the architecture of a network showing the relationship between the major elements of one embodiment of the subject invention.

FIG. 2 illustrates in further detail the architecture of the specific components connected to network 102 showing the relationship between the major elements of one embodiment of the subject invention. Attached to the network are thermostats 108 and computers 104 of various users. Connected to thermostats 108 are HVAC units 110. The HVAC units may be conventional air conditioners, heat pumps, or other devices for transferring heat into or out of a building. Each user is connected to the servers 106a via wired or wireless connection such as Ethernet or a wireless protocol such as IEEE 802.11, a gateway or wireless access point 11 that connects the computer and thermostat to the Internet via a broadband connection such as a digital subscriber line (DSL) or other form of broadband connection to the World Wide Web. In one embodiment, thermostat management server 106 is in communication with the network 102. Server 106 contains the content to be served as web pages and viewed by computers 104, as well as databases containing information used by the servers, and applications used to remotely manage thermostats 108.

Figure 3:
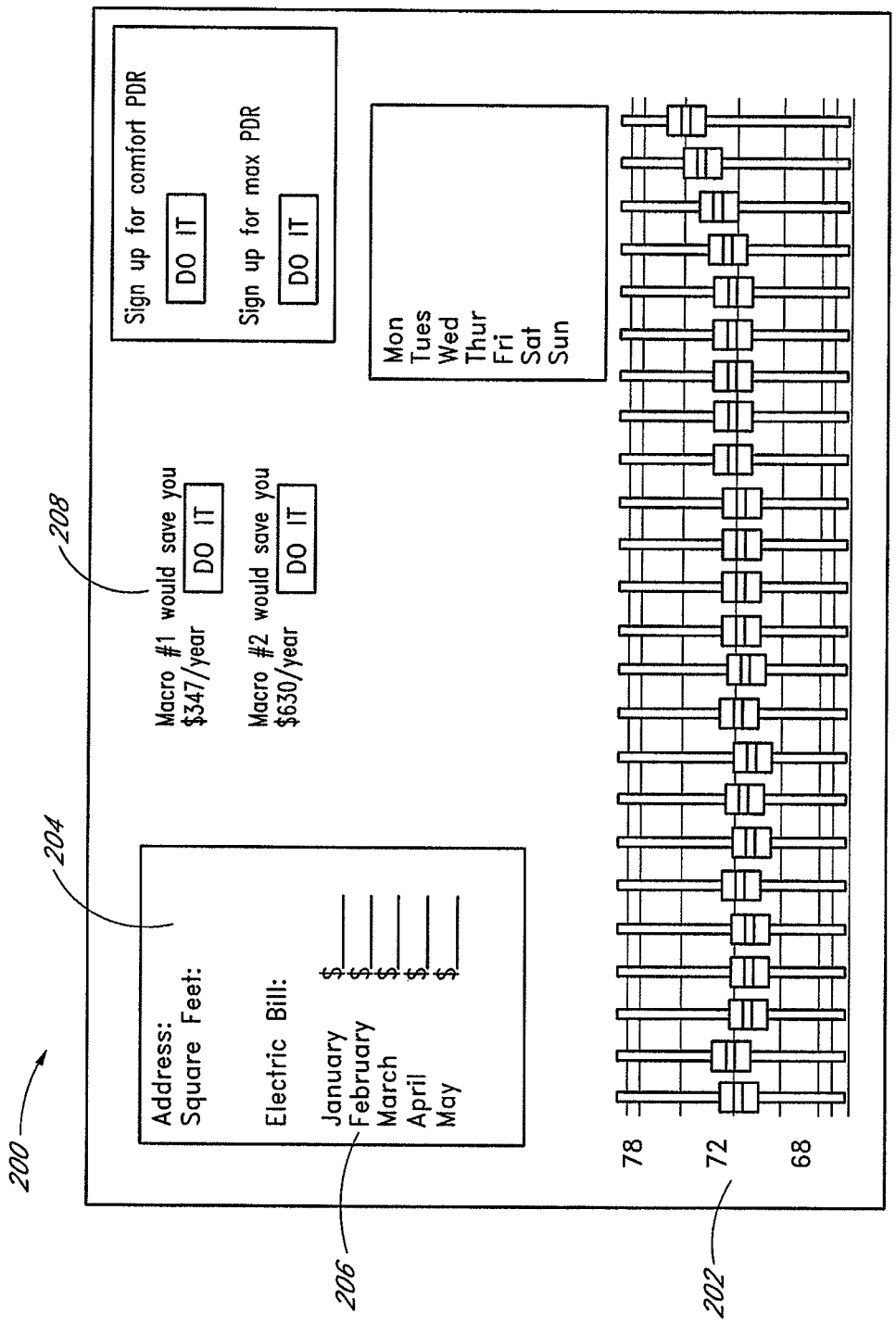
FIG. 3 shows an embodiment of the website to be used as part of the subject invention.

In the currently preferred embodiment, the website 200 includes a number of components accessible to the user, as shown in FIG. 3. Those components may include a means to store temperature settings 202, a means to enter information about the user's home 204, a means to enter the user's electricity bills 206, and means 208 to elect to enable the subject invention.

Figure 4:
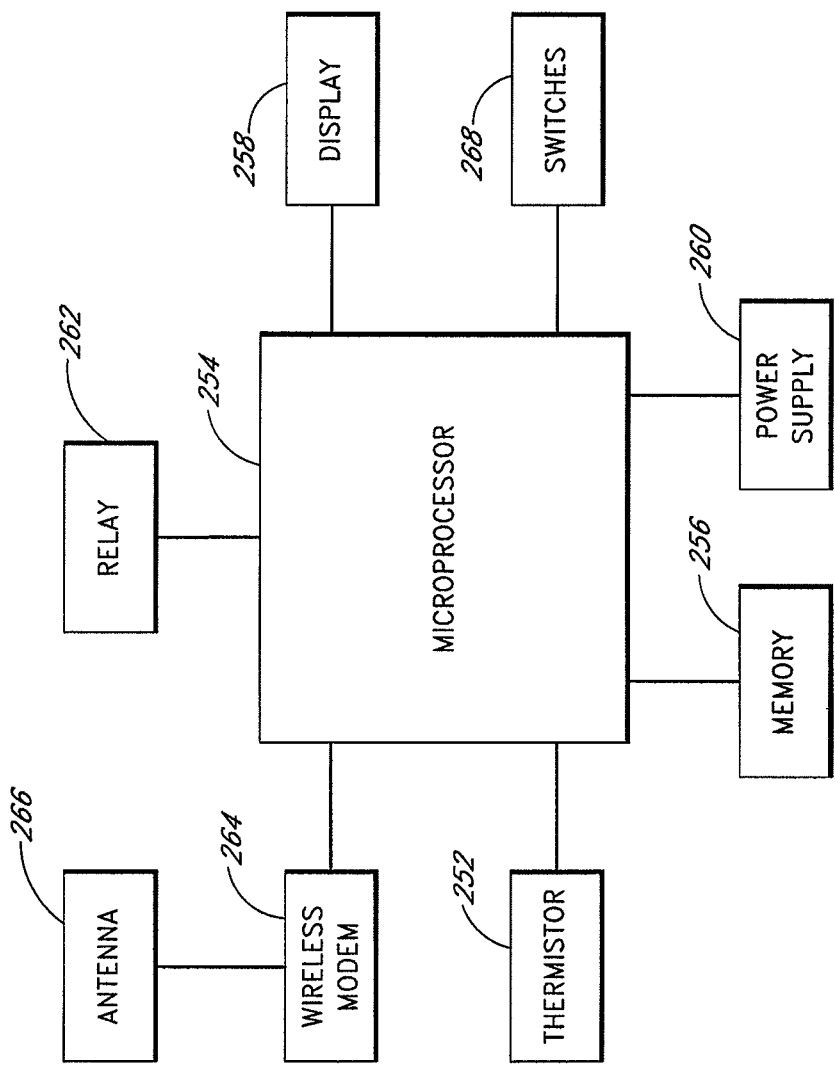
FIG. 4 shows a high-level schematic of the thermostat used as part of the subject invention.

FIG. 4 shows a high-level block diagram of thermostat 108 used as part of the subject invention. Thermostat 108 includes temperature sensing means 252, which may be a thermistor, thermal diode or other means commonly used in the design of electronic thermostats. It includes a microprocessor 254, memory 256, a display 258, a power source 260, at least one relay 262, which turns the HVAC system on and off in response to a signal from the microprocessor, and contacts by which the relay is connected to the wires that lead to the HVAC system. To allow the thermostat to communicate bi-directionally with the computer network, the thermostat also includes means 264 to connect the thermostat to a local computer or to a wireless network. Such means could be in the form of Ethernet, wireless protocols such as IEEE 802.11, IEEE 802.15.4, Bluetooth, or other wireless protocols. The thermostat may be connected to the computer network directly via wired or wireless Internet Protocol connection. Alternatively, the thermostat may connect wirelessly to a gateway such as an IP-to-Zigbee gateway, an IP-to-Z-wave gateway, or the like. Where the communications means enabled include wireless communication, antenna 266 will also be included. The thermostat 250 may also include controls 268 allowing users to change settings directly at the thermostat, but such controls are not necessary to allow the thermostat to function. Specifically excluded from thermostat 108 should be any non-overrideable means for prescribing a specific compressor delay.

Figure 5:
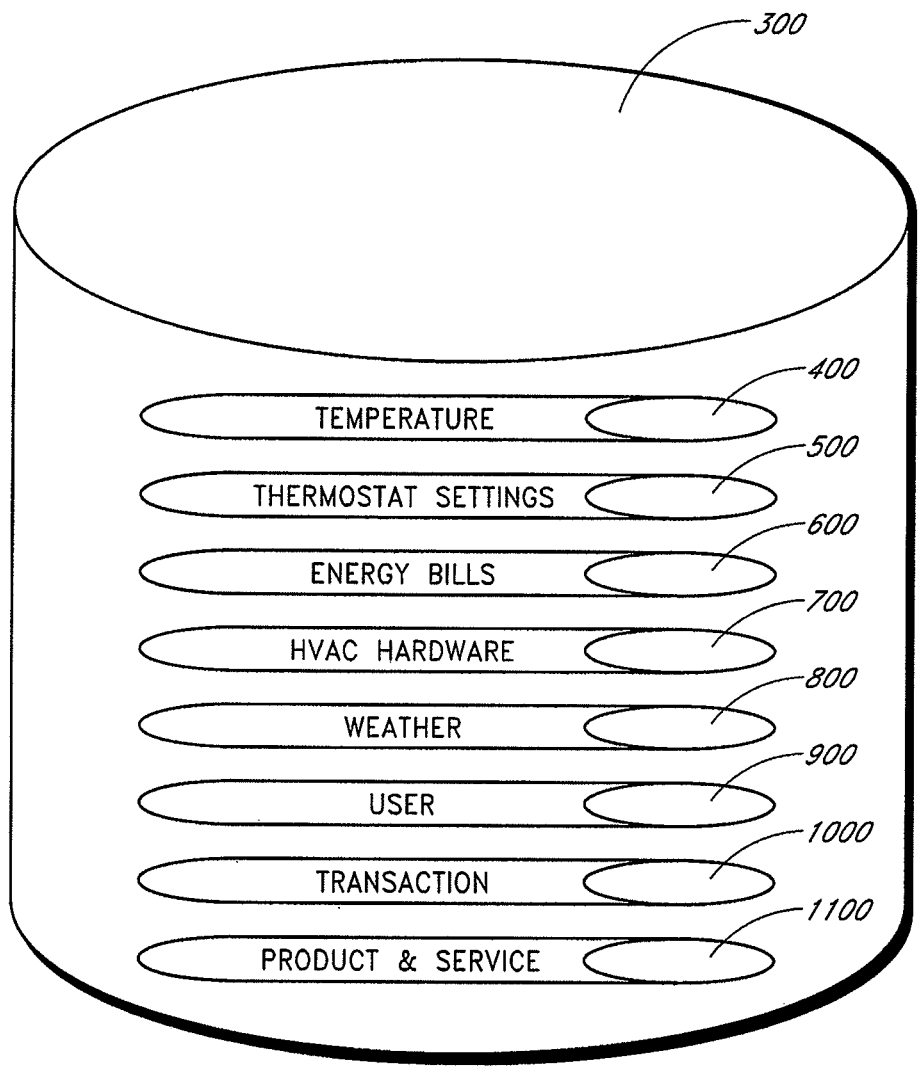
FIG. 5 shows one embodiment of the database structure used as part of the subject invention

The data used to generate the content delivered in the form of the website and to automate control of thermostat 108 is stored on one or more servers 106 within one or more databases. As shown in FIG. 5, the overall database structure 300 may include temperature database 400, thermostat settings database 500, energy bill database 600, HVAC hardware database 700, weather database 800, user database 900, transaction database 1000, product and service database 1100 and such other databases as may be needed to support these and additional features.

The website will allow users of connected thermostats 108 to create personal accounts. Each user's account will store information in database 900, which tracks various attributes relative to users. Such attributes may include the make and model of the specific HVAC equipment in the user's home; the age and square footage of the home, the solar orientation of the home, the location of the thermostat in the home, the user's preferred temperature settings, etc.

As shown in FIG. 3, the website 200 will permit thermostat users to perform through the web browser substantially all of the programming functions traditionally performed directly at the physical thermostat, such as temperature set points, the time at which the thermostat should be at each set point, etc. Preferably the website will also allow users to accomplish more advanced tasks such as allow users to program in vacation settings for times when the HVAC system may be turned off or run at more economical settings, and set macros that will allow changing the settings of the temperature for all periods with a single gesture such as a mouse click.

In addition to using the system to allow better signaling and control of the HVAC system, which relies primarily on communication running from the server to the thermostat, the bi-directional communication will also allow the thermostat 108 to regularly measure and send to the server information about the temperature in the building. By comparing outside temperature, inside temperature, thermostat settings, cycling behavior of the HVAC system, and other variables, the system will be capable of numerous diagnostic and controlling functions beyond those of a standard thermostat.

Figure 6A:
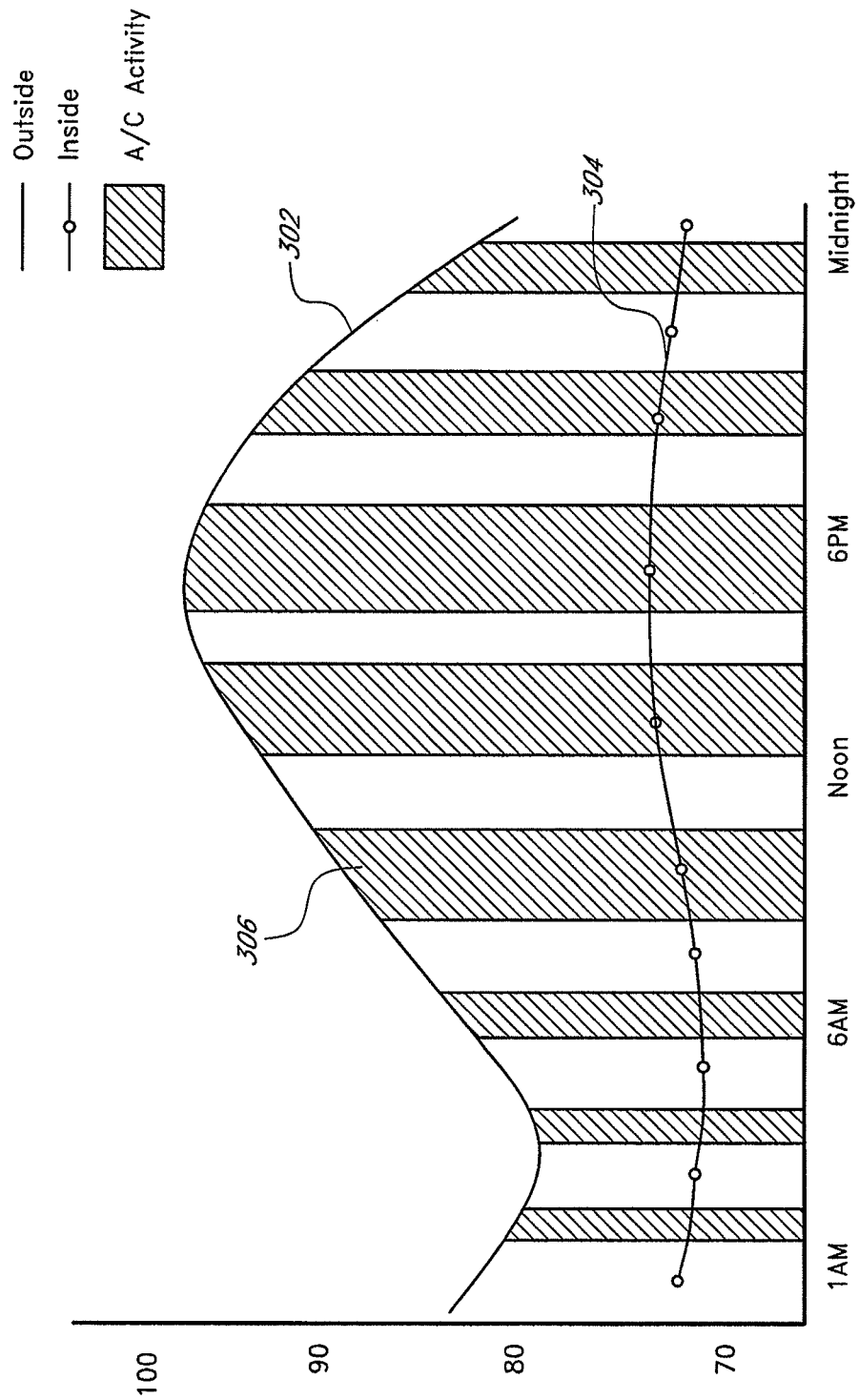
FIGS. 6a and 6b show how comparing inside temperature against outside temperature and other variables permits calculation of dynamic signatures.

For example, FIG. 6a shows a graph of inside temperature, outside temperature and HVAC activity for a 24 hour period. When outside temperature 302 increases, inside temperature 304 follows, but with some delay because of the thermal mass of the building, unless the air conditioning 306 operates to counteract this effect. When the air conditioning turns on, the inside temperature stays constant (or rises at a much lower rate or even falls) despite the rising outside temperature. In this example, frequent and heavy use of the air conditioning results in only a very slight temperature increase inside o the house of 4 degrees, from 72 to 76 degrees, despite the increase in outside temperature from 80 to 100 degrees.

Figure 6B:
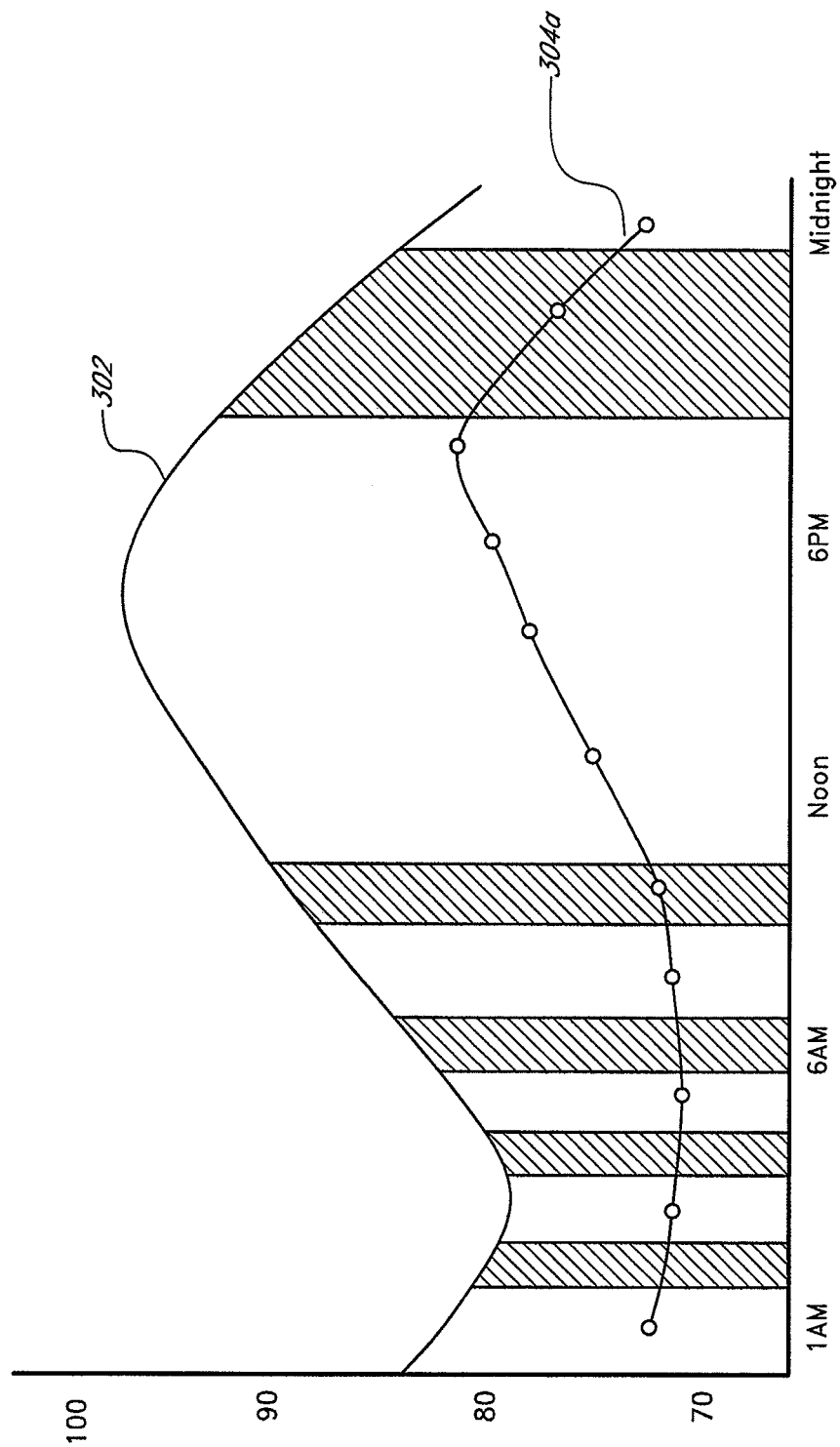

FIG. 6b shows a graph of the same house on the same day, but assumes that the air conditioning is turned off from noon to 7 PM. As expected, the inside temperature 304a rises with increasing outside temperatures 302 for most of that period, reaching 88 degrees at 7 PM.

Because server 106 logs the temperature readings from inside each house (whether once per minute or over some other interval), as well as the timing and duration of air conditioning cycles, database 300 will contain a history of the thermal performance of each house. That performance data will allow server 106 to calculate an effective thermal mass for each such structure—that is, the speed with the temperature inside a given building will change in response to changes in outside temperature. Because the server will also log these inputs against other inputs including time of day, humidity, etc. the server will be able to predict, at any given time on any given day, the rate at which inside temperature should change for given inside and outside temperatures.

The ability to predict the rate of change in inside temperature in a given house under varying conditions may be applied by in effect holding the desired future inside temperature as a constraint and using the ability to predict the rate of change to determine when the HVAC system must be turned on in order to reach the desired temperature at the desired time.

Figure 7:
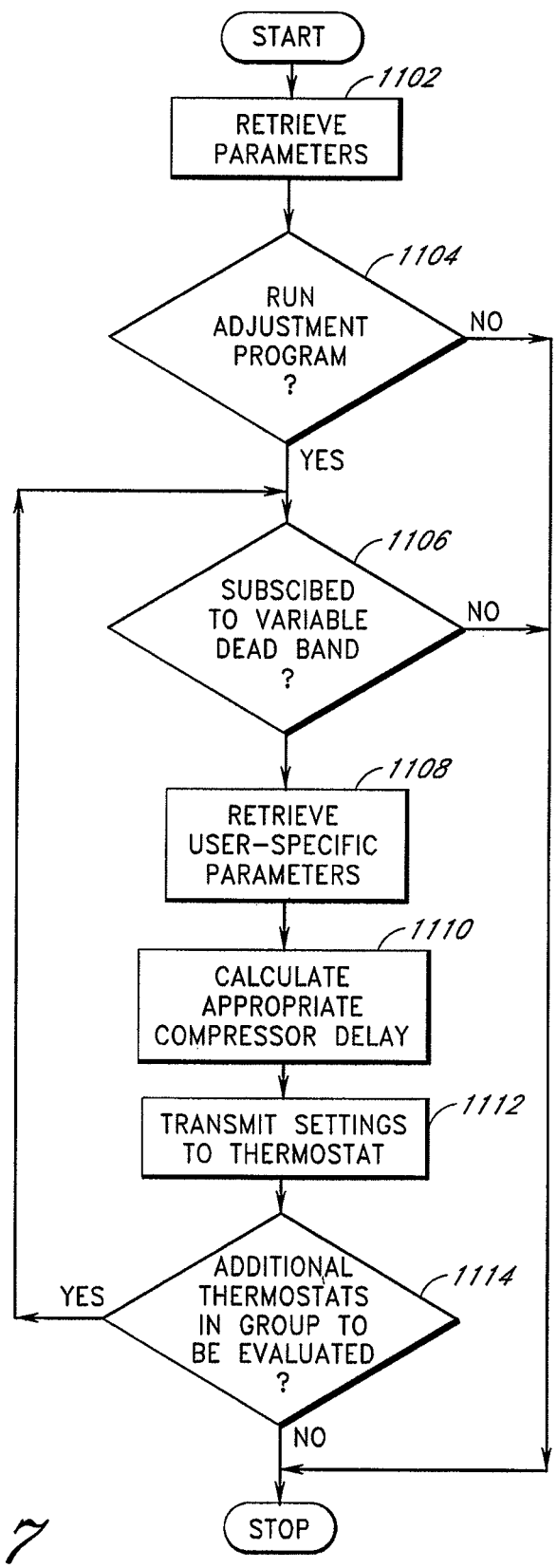
FIG. 7 shows a flowchart illustrating the steps required to initiate a compressor delay adjustment event.

FIG. 7 shows a flowchart illustrating the steps required to initiate a compressor delay adjustment event. In step 1102, server 106 retrieves parameters such as weather conditions, the current price per kilowatt-hour of electricity, and the state of the electric grid in terms of supply versus demand for the geographic area that includes a given home. In step 1104 server 106 determines whether to instantiate the compressor delay adjustment program for certain homes in response to those conditions. In step 1106, server 106 determines whether a specific home is subscribed to participate in compressor delay events. If a given home is eligible, then in step 1108 the server retrieves the parameters needed to specify the compressor delay routine. These may include user preferences, such as the weather, time of day and other conditions under which the homeowner has elected to permit hysteresis band changes, the maximum length of compressor delay authorized, etc. In step 1110 the appropriate compressor delay settings are determined, and in step 1112 the chosen settings are communicated to the thermostat.

Figure 8B:
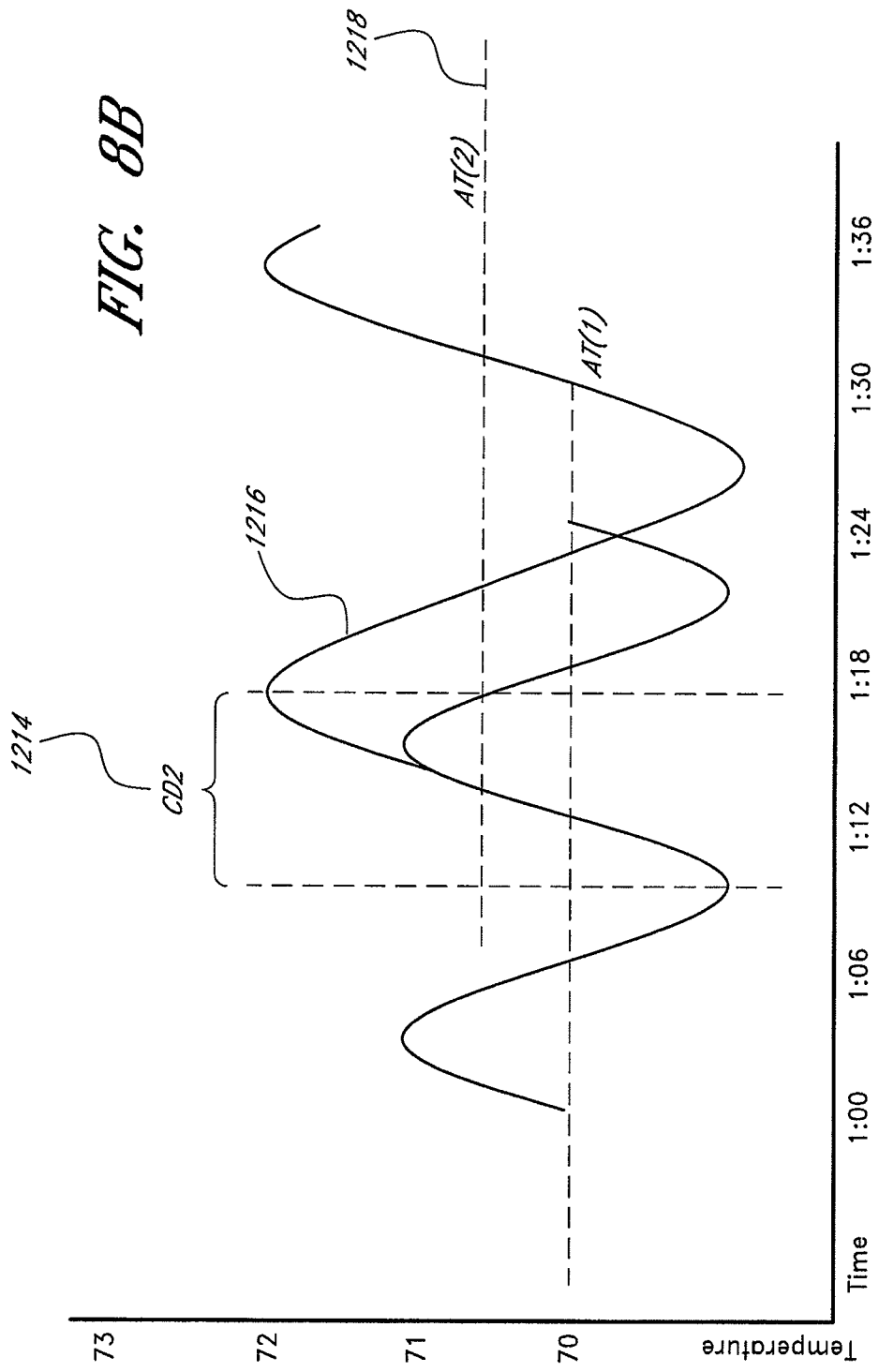
Figure 8C:
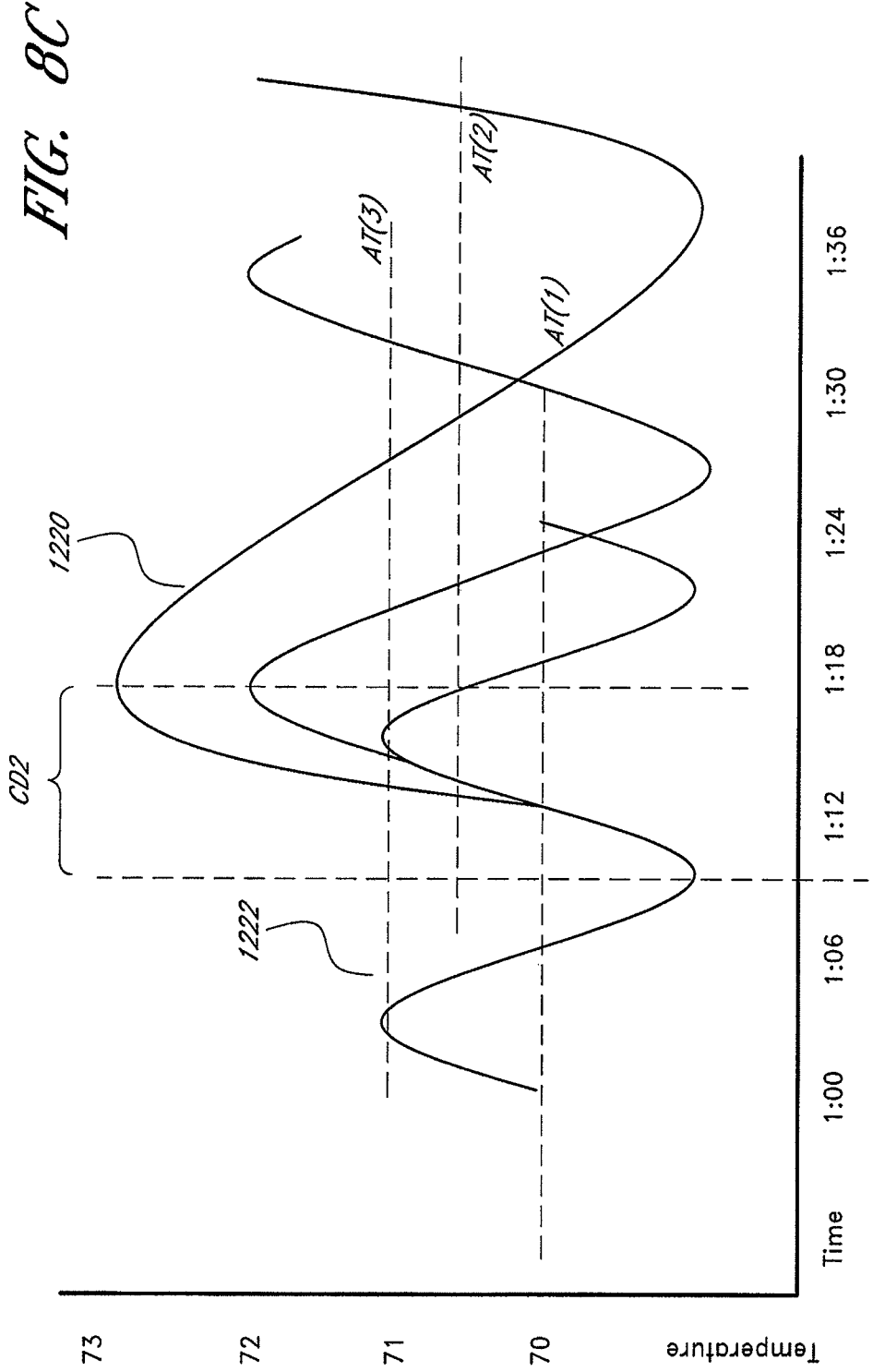

FIGS. 8(a) through 8(c) illustrate how changes in compressor delay settings affect HVAC cycling behavior by plotting time against temperature. In FIG. 8(a), time is shown on the horizontal axis 1202, and temperature is shown on vertical axis 1204. The setpoint for thermostat 108 is 70 degrees F., which results in the cycling behavior shown for inside temperature 1206. Because compressor delay CD1 1208 is, at approximately 3 minutes, shorter than the natural duration of a compressor off cycle Off1 1210 at approximately 6 minutes for this particular house under the illustrated conditions, the compressor delay has no effect on the operation of the HVAC system. Because the hysteresis band operates so as to maintain the temperature within a range of plus or minus one degree of the setpoint, in the case of air conditioning the air conditioner will switch on when the inside temperature reaches 71 degrees, continue operating until it reaches 69 degrees, then shut off. The system will then remain off until it reaches 71 degrees again, at which time it will switch on. The percentage of time during which inside temperature is above or below the setpoint will depend on conditions and the dynamic signature of the individual, home. Under the conditions illustrated, the average inside temperature AT1 1212 is roughly equal to the setpoint of 70 degrees.

FIG. 8(*b*) shows how with the same environmental conditions as in FIG. 8(*a*), the cycling behavior of the inside temperature changes when the compressor delay is longer than the natural compressor off cycle Off1 1210. Extended compressor delay CD2 1214 allows inside temperature 1216 to climb above the range normally enforced by the hysteresis band. Because CD2 is roughly minutes, under the given conditions the inside temperature climbs to approximately 72 degrees before the compressor delay allows the air conditioner to restart and drive the inside temperature back down. But as before, the air conditioner shuts off when the inside temperature reaches 69 degrees. Thus the average temperature is increased from AT1 1212 to AT2 1218. This change will save energy and reduce cycling because it takes less energy to maintain a higher inside temperature with an air conditioner.

FIG. 8(*c*) shows how the same compressor delay can result in different thermal cycling with different weather conditions. The greater the amount by which outside temperature exceeds inside temperature in the air conditioning context, the more rapidly the inside temperature will increase during an off cycle, and the slower the air conditioner will be able to cool during the on cycle. Thus as compared to FIG. 8(*b*), when the inside temperature increased to roughly 72 degrees during the extended compressor delay of 8 minutes, a higher outside temperature will cause the inside temperature to increase faster, which results in a peak temperature of roughly 73 degrees, and in wider temperature cycling 1220. The average inside temperature consequently increases from AT(2) 1218 to AT(3) 1222.

It should be noted that the shape of the actual waveform will most likely not be sinusoidal, but for ease of illustration it is sometimes be presented as such in the figures.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A heating, ventilation and air conditioning system comprising at least a compressor and a thermostatic controller that varies the delay enforced by a thermostatic controller between the time said controller turns a ventilation system off and the time said thermostatic controller turns said ventilation system on again, the system comprising:
one or more computer processors configured to communicate with a thermostatic controller that has at least a first setting that defines a first delay interval and at least a second setting that defines a second delay interval associated with turning a ventilation system on again, wherein the second interval is longer than the first interval;
the one or more computer processors configured to access stored data comprising a plurality of internal temperature measurements taken within a structure and a plurality of outside temperature measurements relating to temperatures outside the structure;
the one or more computer processors configured to use the stored data to predict a rate of change of temperatures inside the structure in response to at least changes in outside temperatures;
the one or more computer processors configured to evaluate one or more parameters including at least the outside temperature measurements and the predicted rate of change; and
the one or more computer processors, based upon said evaluation of the parameters, configures the thermostatic controller to one of the at least the first setting that defines the first delay interval or the second setting that defines the second delay interval such that said heating, ventilation and air conditioning system operates according to the selected setting.

2. The system of claim 1 wherein the first and second settings that define first and second delay intervals define compressor delay intervals.

3. The system of claim 2 wherein the one or more processors are configured to vary the compressor delay intervals by varying the first and second settings.

4. The system of claim 1 wherein the one or more processors are configured to calculate at least one compressor delay based on the one or more parameters.

5. The system of claim 4 wherein the one or more processors are configured to set the thermostatic controller to reduce energy consumption of said heating, ventilation and air conditioning system.

6. The system of claim 1 wherein the one or more processors are configured to calculate at least one compressor delay to vary a hysteresis band associated with said heating, ventilation and air conditioning system.

7. The system of claim 1 wherein the thermostatic controller operates a system for changing the air temperature in a structure.

8. The system of claim 1 wherein the thermostatic controller operates said heating, ventilation and air conditioning system.

9. The system of claim 1 wherein the thermostatic controller operates said heating, ventilation and air conditioning system in a single family residence.

10. The system of claim 1 wherein the thermostatic controller is programmable.

11. A process that varies the delay enforced by a thermostatic controller between the time said controller turns a ventilation system off and the time said thermostatic controller turns said ventilation system on again, the process comprising:
accessing stored data comprising a plurality of internal temperature measurements taken within a structure and a plurality of outside temperature measurements relating to temperatures outside the structure;
using the stored data to predict a rate of change of temperatures inside the structure in response to at least changes in outside temperatures;
evaluate one or more parameters including at least the outside temperature measurements and the predicted rate of change; and setting a thermostatic controller to one of the at least a first setting that defines a first delay interval or a second setting that defines a second delay interval associated with turning a ventilation system on again, wherein the second interval is longer than the first interval; and operating said ventilation system according to said selected setting.

12. The method of claim 11 wherein the first and second settings that define first and second delay intervals define compressor delay intervals.

13. The method of claim 12 wherein setting the thermostatic controller varies the compressor delay intervals by varying the first and second settings.

14. The method of claim 11 further comprising calculating at least one compressor delay based on the one or more parameters.

15. The method of claim 11 wherein setting the thermostatic controller reduces energy consumption of the ventilation system.

16. The method of claim 11 further comprising calculating at least one compressor delay to vary a hysteresis band associated with the ventilation system.

17. The method of claim 11 wherein the thermostatic controller operates a system for changing the air temperature in a structure.

18. The method of claim 11 where the thermostatic controller operates a heating, ventilation and air conditioning system.

19. The method of claim 11 wherein the thermostatic controller operates a heating, ventilation and air conditioning system in a single family residence.

20. The method of claim 11 wherein the thermostatic controller is programmable.

* * * * *